(12) United States Patent
Yao et al.

(10) Patent No.: US 8,466,223 B2
(45) Date of Patent: Jun. 18, 2013

(54) COMPOSITE MATERIAL

(75) Inventors: Yuan Yao, Beijing (CN); Chang-Shen Chang, New Taipei (TW)

(73) Assignees: Tsingua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/550,687

(22) Filed: Jul. 17, 2012

(65) Prior Publication Data

US 2012/0282650 A1 Nov. 8, 2012

Related U.S. Application Data

(62) Division of application No. 12/578,151, filed on Oct. 13, 2009, now Pat. No. 8,247,528.

(30) Foreign Application Priority Data

Nov. 26, 2008 (CN) .......................... 2008 1 0217965

(51) Int. Cl.
*C08G 63/00* (2006.01)
*C08G 63/02* (2006.01)

(52) U.S. Cl.
USPC ........... 524/432; 241/25; 252/31.35; 528/503

(58) Field of Classification Search
USPC ......................... 241/25; 252/301.35; 528/503
See application file for complete search history.

(56) References Cited

U.S. PATENT DOCUMENTS

| 7,068,898 | B2 | 6/2006 | Buretea et al. | |
| 8,247,528 | B2 * | 8/2012 | Yao et al. | 528/503 |
| 2007/0082459 | A1 * | 4/2007 | Faris | 438/455 |
| 2007/0184288 | A1 | 8/2007 | Garamszegi et al. | |

* cited by examiner

*Primary Examiner* — Terressa Boykin
(74) *Attorney, Agent, or Firm* — Altis Law Group, Inc.

(57) ABSTRACT

A composite material includes a body and a plurality of nano-scale probes. The body is made of a polymer. The plurality of nano-scale probes is embedded in the body. The nano-scale probes are substantially uniformly distributed in the polymer matrix. The nano-scale probes are nanowires, nano-particles or nanotubes.

10 Claims, 2 Drawing Sheets

COMPOSITE MATERIAL

CROSS-REFERENCE TO RELATED APPLICATIONS

This application is a divisional of U.S. Pat. No. 8,247,528, filed on Oct. 13, 2009, and issued on Aug. 25, 2012, entitled, "COMPOSITE MATERIAL AND METHOD FOR MAKING THE SAME". Disclosure of the above-identified applications and/or patents are incorporated herein by reference.

BACKGROUND

1. Technical Field

The present disclosure relates to a composite material.

2. Discussion of Related Art

Composite material generally includes two or more kinds of solid materials having different properties. Composites material formed by nano-particles and a matrix material have excellent physical properties and generally have a core-shell structure. According to a prior art, a composite material is formed using nano-alumina particles and a titanium oxide matrix. The composite material is prepared by sintering. The sintering method is generally suitable for preparing composite material having a ceramic matrix, but is not suitable for preparing composite material having a polymer matrix material, thereby restricting the application of the sintering method.

To solve the above problem, a light-emitting zinc oxide-polymer material, e.g., zinc oxide-polymer particle, having the core-shell structure and a method for making the same is provided. A zinc oxide quantum dot with a size of about 10 nanometers is distributed in the core of each of the zinc oxide-polymer particles. The shell of the light-emitting zinc oxide-polymer particle has a two-layer structure, an inner layer that is poly methyl methacrylate and an outer layer that is polyethylene glycol mono methyl ether. A sol-gel method is used to make the zinc oxide-polymer particle, and the method includes: dissolving zinc acetate in the anhydrous ethanol; adding lye to promote hydrolysis of zinc acetate, thereby forming zinc oxide nano-particles with modification of organic double bond; adding a trigger agent and polymer monomer into the above reaction system, initiating polymerization reaction, and forming copolymer shell on the surface of the zinc oxide nano-particles.

This kind of composite material can undergo surface modification during application thereof to make it have different surface activity, and thus can be applied in different fields. However, the zinc oxide-polymer particle with the core-shell structure just has one zinc oxide quantum dot. When a plurality of zinc oxide-polymer particles are required, such as when the light-emitting zinc oxide-polymer particles are used as fluorescent marker in the medical field, a large amount of surface modification agent is required. Furthermore, the method for making the zinc oxide-polymer particle is complicated.

What is needed, therefore, is a composite material in which the above problems are eliminated or at least alleviated.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
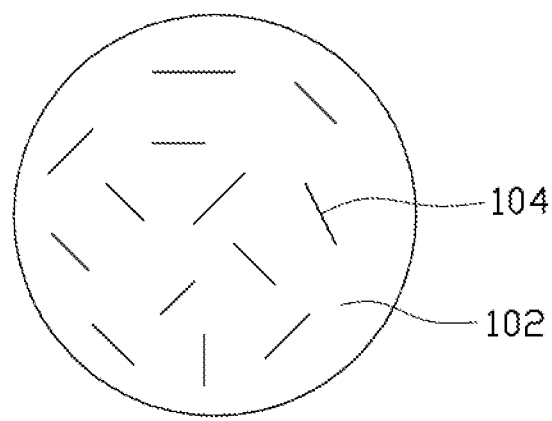
FIG. 1 is a schematic view of one embodiment of a composite material.

Referring to FIG. 1, a composite material 10, according to one embodiment, includes a body 102 made of a polymer capable of solidifying and a plurality of nano-scale probes 104 embedded in the body 102. The composite material 10 can be in a form of individual particulates, powder, or other form. In one embodiment, the composite material 10 is in a form of particulates.

The body 102 can be in micro-scale, and have a diameter of less than 1000 micrometers. The polymer can be one of resin, rubber and plastic. The polymer may be, for example, polystyrene, polyethylene, polypropylene, polyvinyl chloride (PVC), polytetrafluoroethylene (PTFE), natural rubber, polyoxymethylene (POM), or metaldehyde. In one embodiment, the polymer is translucent and non-toxic polyethylene.

The nano-scale probes 104 can be nanowires, nano-particles, or nanotubes. The nano-scale probes 104 can be made of metal, semiconducting, or insulative material. The metal can be, for example, nickel, platinum, or gold. The semiconducting material can be, for example, any of gallium arsenide, gallium phosphide, gallium nitride, cadmium sulfide, tin oxide, titanium dioxide, zinc oxide, and so on. The insulative material can be, for example, silicon dioxide or titanium dioxide. The nano-scale probes 104 can be quantum dots. The nano-scale probes 104 can have a diameter of less than 100 nanometers. The length of the nanowires or nanotubes 104 is not limited. In one embodiment, the nano-scale probes 104 are semiconducting nanowires. In another embodiment, the nano-scale probes 104 are zinc oxide nanowires. The diameter of the zinc oxide nanowires is less than 50 nanometers, and the length thereof is not limited. A diameter of the composite material 10 can be less than 1000 micrometers. In one embodiment, the diameter of the composite material 10 is in a range from about 300 to about 700 micrometers. In another embodiment, the diameter of the composite material 10 is 500 micrometers.

The plurality of nano-scale probes 104 is dispersed uniformly in the composite material 10. In one embodiment, the composite material 10 includes a plurality of zinc oxide nanowires 104 dispersed in the body 102 made of polyethylene.

The composite material 10 can further include an additive or a mixture of a variety of additives. The additive can be chosen from a group that includes curing agents, modifiers, fillers, thinner, and so on. The curing agents are used for curing the polymer matrix material. The curing agents can be, for example, chosen from a group that includes fatty amines, alicyclic amines, aromatic amines, polyamide, acid anhydride, resin, tertiary amine and a mixture thereof. The modifiers are used to improve flexibility, shear, bending, impact, insulation of the body 102. The modifiers include, for example, one of polysulfide rubber, polyamide resins, polyvinyl butyral, and nitrile butadiene rubber. The fillers are used to improve heat dissipation of the body 102 during the curing process thereof. The fillers can include asbestos fibers, glass fibers, quartz powders, ceramic powders, alumina powders or silica powders. The thinner is used to reduce resin viscosity and improve the permeability of the resin. The thinner may be, for example, diglycidyl ether, multi-glycidyl ether, glycidyl butyl ether, phenyl glycidyl ether, propylene oxide phenyl ether, or allylphenol.

The composite material 10 has different applications according to different material of the nano-scale probes 104. In one embodiment, the composite material 10 including a plurality of probes 104 dispersed in the body 102 can be used as fluorescent markers in the medical field. In use, the composite material 10 can be surface modified to fix some biochemical identification markings thereon, so that the composite material 10 will adhere to cancer cells with the biochemical identification marks thereon. Since the nano-scale probes 104, e.g., zinc oxide nanowires as semiconductor light-emitting materials, may emit a specific wavelength of light, and the material of the body 102, such as polyethylene, is translucent, light emitted from the nano-scale probes 104 can penetrate the body 102, therefore the location and luminous intensity of the nano-scale probes 104 can be seen by an optical recognition device, and thus the presence or absence of certain cancer cells, and the location and quantity thereof can be identified. The composite material 10 having a plurality of nano-scale probes 104 therein does not require as much surface modification agent, and can emit a greater intensity of specific wavelength of light compared to the composite having one nano-scale probe therein.

Figure 2:
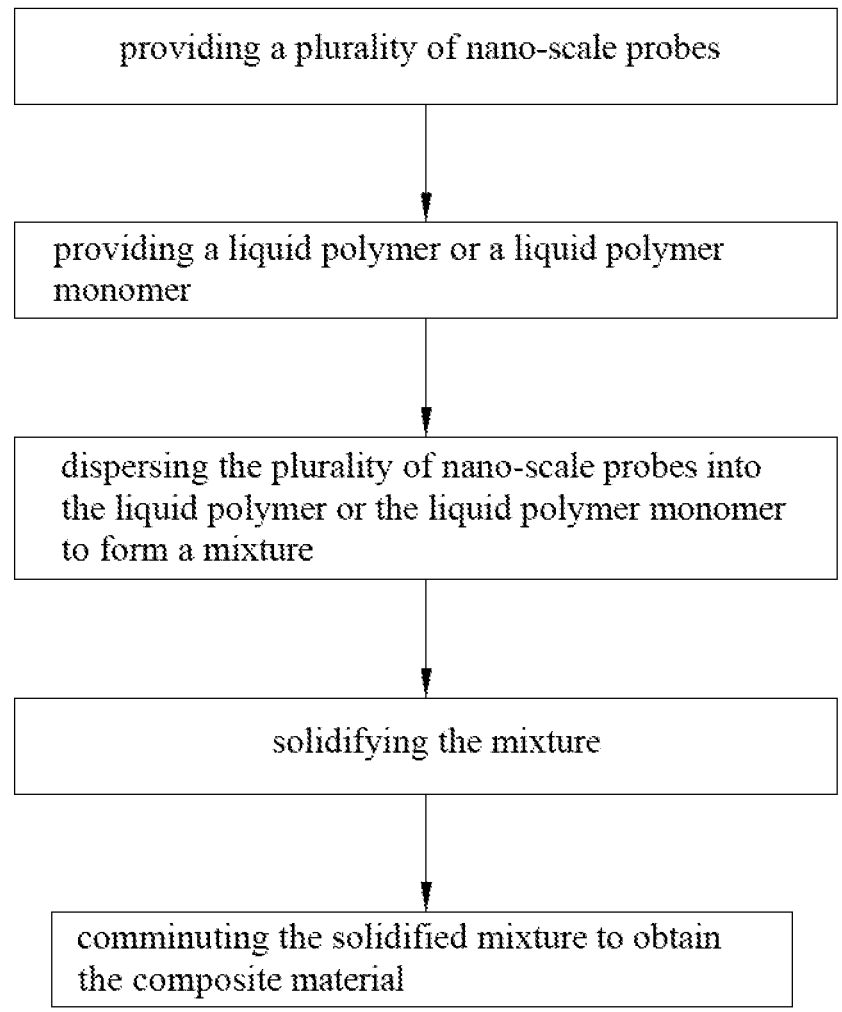
FIG. 2 is a flow chart of a method for making a composite material in accordance with one embodiment.

Referring to FIG. 2, a method for making a composite material 10 is further provided. The method includes the following steps: (a) providing a plurality of nano-scale probes 104; (b) providing a liquid polymer or a liquid polymer monomer; (c) dispersing the plurality of nano-scale probes 104 into the liquid polymer or the liquid polymer monomer to form a mixture; (d) solidifying the mixture; (e) comminuting the solidified mixture to obtain the composite material 10.

In step (a), a method for making the nano-scale probes 104 includes a chemical vapor deposition method, a template-assisted growth method, a metal organic vapor phase epitaxy growth method or a colloid chemical self-assembly method. In one embodiment, the nano-scale probes 104 are zinc oxide nanowires, a diameter of the nano-scale probes 104 is less than 100 nanometers, and a length thereof is not limited. The nano-scale probes 104 can be prepared by the template-assisted growth method. The method includes the following steps of: providing a porous alumina template having a plurality of micropores; depositing zinc in the plurality of micropores of the porous alumina template; and oxidizing the zinc to form a plurality of zinc oxide nanowires.

The nano-scale probes 104 can be treated by an organic solvent. The organic solvent can be, for example, ethanol, methanol, acetone, dichloroethane and chloroform. The nano-scale probes 104, after being treated by organic solvent, are conducive to being dispersed in the body 102 since surfaces of the nano-scale probes 104 are wet. In one embodiment, the zinc oxide nanowires are immersed in ethanol for a period of time to soak the zinc oxide nanowires. The zinc oxide nanowires remain wet before being dispersed into the liquid polymer or the liquid polymer monomer. The zinc oxide nanowires can be, for example, taken away from the organic solvent, and then immediately added to the liquid polymer or the liquid polymer monomer.

In step (b), the polymer can be a thermosetting or thermoplastic material, such as a resin, rubber or plastic. The material of the polymer can be, for example, polystyrene, polyethylene, polypropylene, polyvinyl chloride (PVC), polytetrafluoroethylene (PTFE), natural rubber, polyoxymethylene (POM), and metaldehyde. The polymer or the polymer monomer can further include one additive or a mixture of a variety of additives. The polymer or the polymer monomer with the additive or additives therein can be mixed uniformly by agitating. The additive can be, for example, chosen from a group that includes curing agents, modifiers, fillers, thinners, and so on. Agitating time can be determined by the material of the polymer or the polymer monomer and the type and amount of the additives. The higher the viscosity and the more the type and amount of the additives, the longer the agitating should be.

In one embodiment, a liquid polyethylene is provided without additive. The polyethylene being waxy at room temperature can be heated to a temperature in a range from about 112° C. to about 135° C. to melt, thereby a liquid polyethylene is acquired.

Step (c) can include the following steps of: adding the plurality of nanowires 104 into the liquid polymer or polymer monomer to form a mixture; and mechanically agitating the mixture while ultrasonically treating the mixture. The step of mechanically agitating the mixture while ultrasonically treating the mixture is done to disperse the nano-scale probes 104 more uniformly in the liquid polymer or the polymer monomer. Agitating time can be determined by the material of the polymer or polymer monomer and the type and amount of the nanowires. The larger the amount of the additive and the higher the viscosity of the polymer or the polymer monomer, the longer the agitating time should be.

The ultrasonic treating process can be executed using an ultrasonic mixer or an ultrasonic dispersion machine. Other acceptable means, such as using a magnetic mixer, can also be adopted.

In step (d), when the mixture includes a thermosetting polymer and the nano-scale probes 104 are dispersed therein, the mixture can be solidified by gradually heating the mixture, for example, via a heating device. Temperature of the mixture cannot be increased too quickly however, or the performance of the composite material 10 will be affected. Solidifying temperature and time of the mixture can be determined by the types and amount of the polymer and additive, and the type and amount of the nano-scale probes 104. The higher the melting temperature of the polymer and the larger the amount of the polymer and the nano-scale probes 104, the longer the solidifying time will be. The heating device can be, for example, a heating plate, a hot-pressing machine, a plate vulcanizing machine, a hot pot, or an oven.

When the mixture includes a thermoplastic polymer and the nano-scale probes 104 are dispersed therein, the mixture can be solidified by cooling the mixture. The mixture can be cooled naturally or by use of a cooling device. The cooling device can be, for example, a recycled water cooler, a hydraulic oil cooler, an oil and water cooler, or other such cooling device.

When the mixture includes the polymer monomer and the nano-scale probes 104, an initiator can be added to the mixture to initiate polymerization of the polymer monomer, thereby forming a solid polymer. The solidified polymer can serve as the body 102 of the composite material 10.

Step (d) can also be executed by other means according to specific polymers or polymer monomers, such as using light-curing techniques. For example, a UV curing method can be used to solidify a body 102 comprising silicone rubber.

In one embodiment, the mixture of polyethylene and zinc oxide nanowires can be solidified using a recycled water cooler.

Step (e) can be executed using a ball milling method, a granulating machine crushing method, a crusher comminuting method, or a gas flow comminuting method. In one embodiment, step (e) is executed using a ball milling method, and includes the following steps of: (e1) providing a ball milling machine having a ball mill tube body, adding grinding bodies having big balls with a diameter of about 8 millimeters, middle balls with a diameter of about 5.5 millimeters, and small balls with a diameter of about 3.9 millimeters, and the solidified mixture into the ball mill tube body, the big balls, middle balls and small balls having a number ratio in a range from about 3:2:1 to about 1:2:3 and mass ratio of grinding bodies to the solidified mixture being in a range from about 1:1 to about 40:1; (e2) ball milling the solidified mixture by the ball milling machine with a rotated speed of about 200 to 580 revolutions per minute and a ball milling time of about 1 to 50 hours, the grinding bodies striking with the solidified mixture under inertia, centrifugal force and friction force, thereby comminuting the solidified mixture and forming the composite material 10.

In step (e), the longer the milling time, the higher the milling speed, the greater the mass ratio of grinding bodies to the solidified mixture, the smaller the mass of the big balls, and the larger the number of the small balls, the smaller the diameter of the composite material 10 will be. The shorter the milling time, the lower the milling speed, the smaller the mass ratio of grinding bodies to the solidified mixture, the bigger the mass of the big balls, and the lower the number of the small balls, the larger the diameter of the composite material 10 will be. In one embodiment, the number ratio of the big balls, the middle balls, and the small balls is about 1:2:3. The mass ratio of grinding bodies to the solidified mixture is about 3:1. In one embodiment, the speed of rotation of the ball milling machine is 350 revolutions per minute and the ball milling time is about 5 hours.

Step (f), of comminuting the composite material 10 further using a gas flow comminuting method in a gas flow crushing machine, can be further provided. Step (f) includes the following steps of: providing a gas flow crushing machine having a gas flow crushing cavity, and adding the composite material 10 into the gas flow crushing cavity; and spraying compressed air into the gas flow crushing cavity by a nozzle; the composite material 10 undergoes repeated collisions, friction, and is sheared under the flow of the compressed air to be further crushed. The crushed composite material 10 is classified and collected. It is understood that step (f) is optional.

The acquired composite material 10 will have a diameter of less than or equal to 1000 micrometers. In one embodiment, the diameter of the acquired composite material 10 is in a range from about 300 micrometers to about 700 micrometers. In another embodiment, the diameter of the acquired composite material 10 is about 500 micrometers.

Compared to sol-gel method or the sintering method, the method of preparing the composite material 10 is simple and easily adapted to mass production.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A composite material, comprising:
   a body made of a polymer;
   a plurality of zinc oxide nanowires embedded in the body, wherein the plurality of zinc oxide nanowires are uniformly distributed in the polymer matrix.

2. The composite material of claim 1, wherein the body in micro-scale has a diameter less than 1000 micrometers.

3. The composite material of claim 1, wherein a diameter of the zinc oxide nanowires is less than 50 nanometers.

4. The composite material of claim 1, wherein the polymer matrix comprises of a material selected from the group consisting of resin, rubber and plastic.

5. The composite material of claim 1, further comprising an additive or a mixture of a variety of additive.

6. The composite material of claim 5, wherein the additive is selected from the group consisting of curing agent, modifier, filler and thinner.

7. The composite material of claim 6, wherein the curing agent is selected from the group consisting of fatty amines, alicyclic amines, aromatic amines, polyamide, acid anhydride, resin, and tertiary amine.

8. The composite material of claim 6, wherein the modifier is selected from the group consisting of polysulfide rubber, polyamide resins, polyvinyl butyral, and nitrile butadiene rubber.

9. The composite material of claim 6, wherein the filler is selected from the group consisting of asbestos fiber, glass fiber, quartz powder, ceramic powder, alumina powder and silica powder.

10. The composite material of claim 6, wherein the thinner is selected from the group consisting of diglycidyl ether, multi-glycidyl ether, glycidyl butyl ether, phenyl glycidyl ether, propylene oxide phenyl ether and allylphenol.

* * * * *